US009930738B2

(12) United States Patent
Pena et al.

(10) Patent No.: US 9,930,738 B2
(45) Date of Patent: Mar. 27, 2018

(54) MANAGEMENT OF BIN INFORMATION IN A LUMINOUS, MOTOR-VEHICLE MODULE COMPRISING SEMICONDUCTOR-COMPONENT LIGHT SOURCES

(71) Applicant: VALEO ILUMINACION, Martos (ES)

(72) Inventors: Miguel-Angel Pena, Martos (ES); Maria Marin, Martos (ES); Juan-Jose Santaella, Martos (ES); Juan Lara-Cabeza, Martos (ES); Antonio Domingo Illan, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 15/463,392

(22) Filed: Mar. 20, 2017

(65) Prior Publication Data
US 2017/0273152 A1    Sep. 21, 2017

(30) Foreign Application Priority Data

Mar. 21, 2016 (FR) ...................... 16 52410

(51) Int. Cl.
*H05B 33/00* (2006.01)
*H05B 33/08* (2006.01)
*B60Q 1/04* (2006.01)
*B60Q 1/00* (2006.01)

(52) U.S. Cl.
CPC ........... *H05B 33/0815* (2013.01); *B60Q 1/00* (2013.01); *B60Q 1/04* (2013.01); *H05B 33/0806* (2013.01)

(58) Field of Classification Search
CPC ...... B60K 35/00; B60L 11/04; B60L 2200/26; B60L 2240/64; B62B 3/0612; B62B 5/063; F16H 2716/08; F16H 61/0202; H02J 7/0014; H02J 7/0021; H02P 7/29
See application file for complete search history.

(56) References Cited

U.S. PATENT DOCUMENTS

2004/0056774 A1   3/2004 Schleicher

FOREIGN PATENT DOCUMENTS

DE    102 30 154 A1    1/2004
EP    2 154 933 B1    6/2011

OTHER PUBLICATIONS

French Preliminary Search Report dated Nov. 17, 2016 in French Application 16 52410, filed on Mar. 21, 2016 ( with English Translation of Categories of Cited Documents).

*Primary Examiner* — Monica C King
(74) *Attorney, Agent, or Firm* — Oblon, McClelland, Maier & Neustadt, L.L.P.

(57) ABSTRACT

The invention proposes to gather bin information identifying semiconductor-component light sources in a luminous module for a motor vehicle by way of a single electronic circuit in which the light sources and the bin information relating thereto are implemented. The invention allows the cabling between a supply device and a printed circuit board containing the electronic circuit according to the invention to be decreased since the bin information required for the configuration of the supply device is gathered actively over the supply line of the light sources.

20 Claims, 2 Drawing Sheets

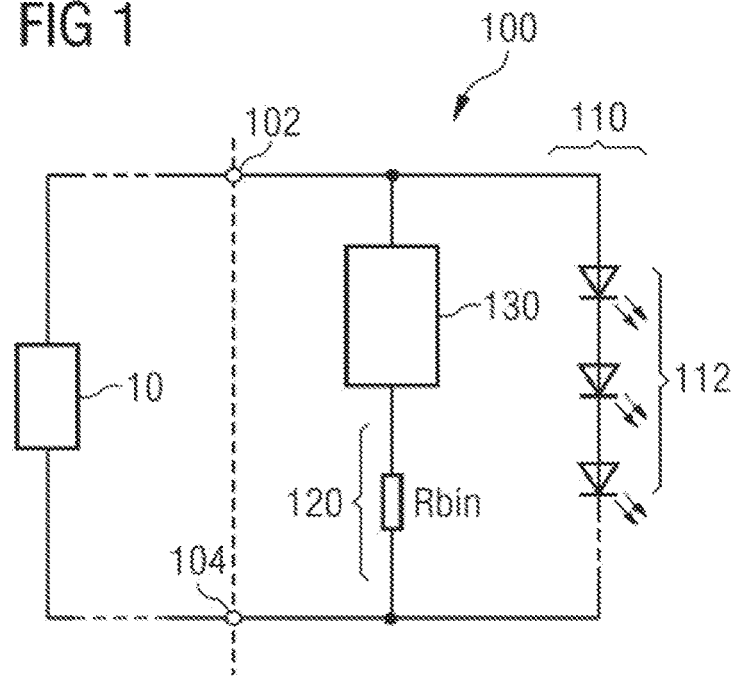
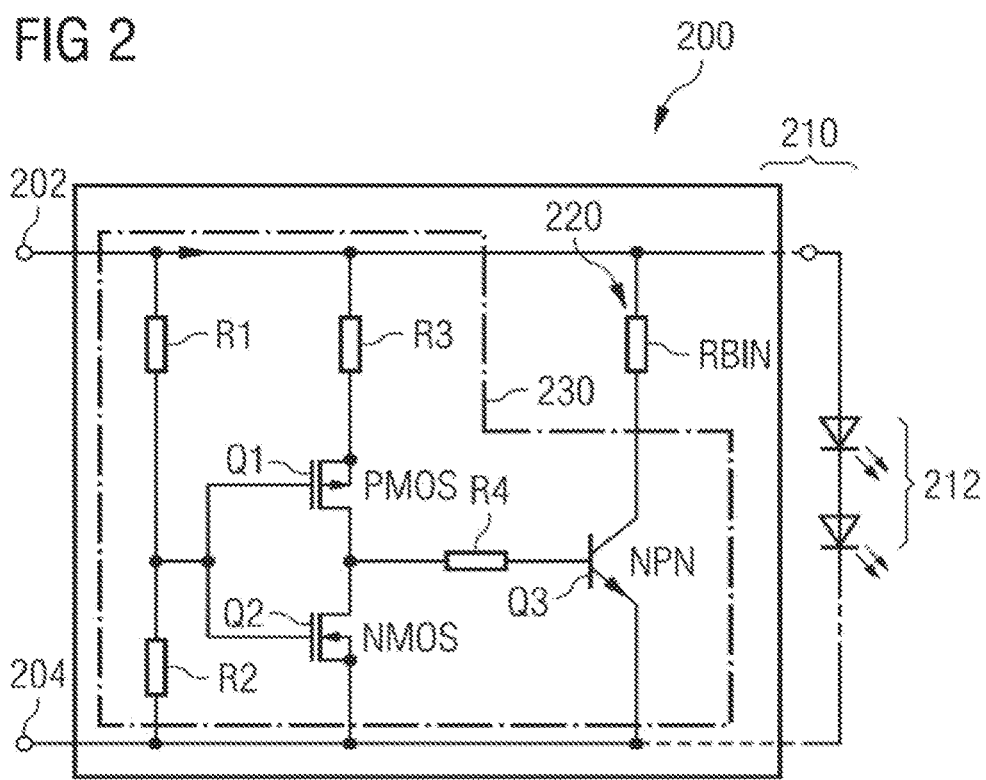

MANAGEMENT OF BIN INFORMATION IN A LUMINOUS, MOTOR-VEHICLE MODULE COMPRISING SEMICONDUCTOR-COMPONENT LIGHT SOURCES

The invention relates to the field of headlamps, in particular for motor vehicles. The invention in particular relates to a luminous module for such a headlamp, the module being equipped with semiconductor-component light sources, bin information of which must be made available to configure the headlamp.

A light-emitting diode (LED) is an electronic component capable of emitting light when an electric current is made to flow therethrough. The light intensity emitted by an LED is in general dependent on the magnitude of the electric current flowing therethrough. In other words, an LED is characterized by a current threshold value. This maximum forward current generally decreases with increasing temperature. Likewise, when an LED emits light, a voltage drop equal to its forward voltage is observed across its terminals. In the motor vehicle field, LED technology is increasingly used in various luminous signaling solutions. LEDs are used to provide luminous functions such as daytime running lights, signal lights, etc. However, the LED components manufactured in a given production batch may have different characteristics (emission capacity, forward voltage, etc.). In order to group components having similar characteristics together, the LEDs produced are sorted into groups, also called bins, each bin containing LEDs having similar characteristics.

It is known in the art to use a control circuit to control the supply of a set or group of LEDs. The circuit defines the voltage applied to a load-mounted branch containing the group of LEDs connected in series. In the field of luminous devices for motor vehicles, it is particularly important to be able to ensure a constant luminosity in order to guarantee the safety of users of the vehicle and of other road users. In order to deliver a constant supply, known control circuits use various types of converters (DC/DC converters, linear converters, resistive converters, etc.) to convert the DC voltage delivered for example by an automobile battery into a DC load voltage that depends on the number of LEDs supplied. The electric current to deliver also depends on the bin of the LEDs to be supplied. For this reason, it is necessary, in known assembly methods, to obtain the bin information corresponding to the LEDs used, in order to correctly program or regulate the control circuit used to supply the LEDs with electric current. Conventionally, the bin information is coded using a resistor of preset resistance, which is placed on the printed circuit board that bears the LEDs in question, in isolation from the load branch that contains the light sources. The circuit for controlling the supply of these LEDs is connected by dedicated connection wires to the printed circuit board bearing the LEDs in order to obtain the resistance of the resistor in question, and to deduce therefrom the bin information. As a result of the increase in the number of luminous functions implemented by LEDs, and with the aim of conveying the bin information as required, the number of connection cables connecting the circuit(s) for controlling supply to the printed circuit boards bearing the LEDs in question has rapidly increased. This not only engenders substantial costs during the production of headlamps for motor vehicles, but also creates substantial design constraints, since the limited space in which all the modules of a luminous device must be housed is decreased by this cabling.

The objective of the invention is to mitigate at least one of the problems posed by the prior art. More precisely, the objective of the invention is to provide a luminous module comprising LED light sources, which decreases the cabling required between the module and its electrical supply control circuit.

One subject of the invention is an electronic circuit for a luminous module of a motor vehicle, the circuit comprising two terminals that are intended for the supply of electric current to the circuit, the circuit comprising at least one semiconductor-component light source forming part of a first circuit branch, and a component Rbin, forming part of a second circuit branch, and comprising a resistor, the resistance of which is representative of a property of at least one light source. The electronic circuit is noteworthy in that the electric circuit comprises a switching unit that is intended to supply said second branch with electricity depending on the magnitude of the electric current delivered to the electric circuit.

The switching unit may preferably be configured so that the second branch is supplied exclusively when an electric current of a magnitude lower than a first preset threshold value is passing through the circuit.

Preferably, the condition of exclusive supply of the second branch is met when all or almost all of the electric current delivered to the electronic circuit flows through the second branch.

Preferably, the switching unit is configured so that the first branch is supplied, in particular exclusively, when an electric current of a magnitude higher than a second preset threshold value is applied to the electronic circuit, the second threshold value being higher than or equal to the first threshold value.

The first threshold value may preferably be lower than 10 mA, and preferably lower than 5 mA. For example, the first threshold value may be 1 mA.

The first circuit branch may preferably be mounted in parallel with the second circuit branch.

Alternatively, the first circuit branch may be mounted in series with the second circuit branch.

The switching unit may preferably comprise a circuit providing a NOT logic function the output of which controls a switching component, the supply of the second circuit branch depending on the state of said switching component.

Preferably, the circuit providing the NOT logic function may comprise a complementary metal-oxide semiconductor (CMOS) inverter.

The switching component may preferably comprise a transistor. It may for example be a metal-oxide-semiconductor field-effect transistor (MOSFET).

The light source may preferably comprise a light-emitting diode (LED), an organic light-emitting diode (OLED), or a laser diode.

The resistance of the resistor Rbin may preferably be representative of a bin value of the light sources of the circuit.

Another subject of the invention is a luminous module for a motor vehicle, comprising means for controlling the electrical supply of at least one semiconductor-component light source. The luminous module is noteworthy in that it comprises an electronic circuit according to the invention, containing said light source.

Another subject of the invention is a method for controlling the electrical supply in a luminous module according to the invention. The method is noteworthy in that it comprises the following steps:

a) supplying the electronic circuit using an electric current of a first magnitude lower than a preset threshold value;
b) measuring the voltage drop in step (a);
c) then, supplying the electronic circuit using an electric current of a second magnitude, the second magnitude being dependent on the voltage drop measured in step (b).

Preferably, the first step has a duration shorter than 20 ms and preferably shorter than 10 ms.

Using the measures proposed by the present invention, it becomes possible to decrease the cabling between a device for controlling the electrical supply of light sources, and a printed circuit board containing said light sources, with respect to known prior-art techniques. Conventionally, a first cable is necessary to guarantee the supply of the light sources, and a dedicated second cable is necessary to gather the bin information of the light sources, which are for example light-emitting diodes (LEDs). Specifically, this bin information is necessary to correctly control the supply of the LEDs. According to the invention, the dedicated second cable becomes superfluous and may be removed, since the bin information may be gathered by the electrical supply control device, depending on the magnitude of the electric current injected by the device into the electronic circuit according to the invention, by means of a single cable intended to supply the LEDs contained in the circuit. The reduction in cabling is particularly great in the context of the design of motor vehicle lights, in which one control device may be required to supply a plurality of luminous functions of the vehicle, requiring a corresponding amount of bin information to be gathered. The decrease in the amount of cabling decreases production cost and also decreases the amount of consideration that must be given to the electromagnetic compatibility of a luminous module during its design.

Other features and advantages of the present invention will be better understood by way of the exemplary description and drawings, in which:

FIG. 1 shows a schematic illustration of a luminous module according to the invention, including an electronic circuit according to one preferred embodiment of the invention;

FIG. 2 shows an electronic circuit according to the invention in one preferred embodiment;

Figure 3:
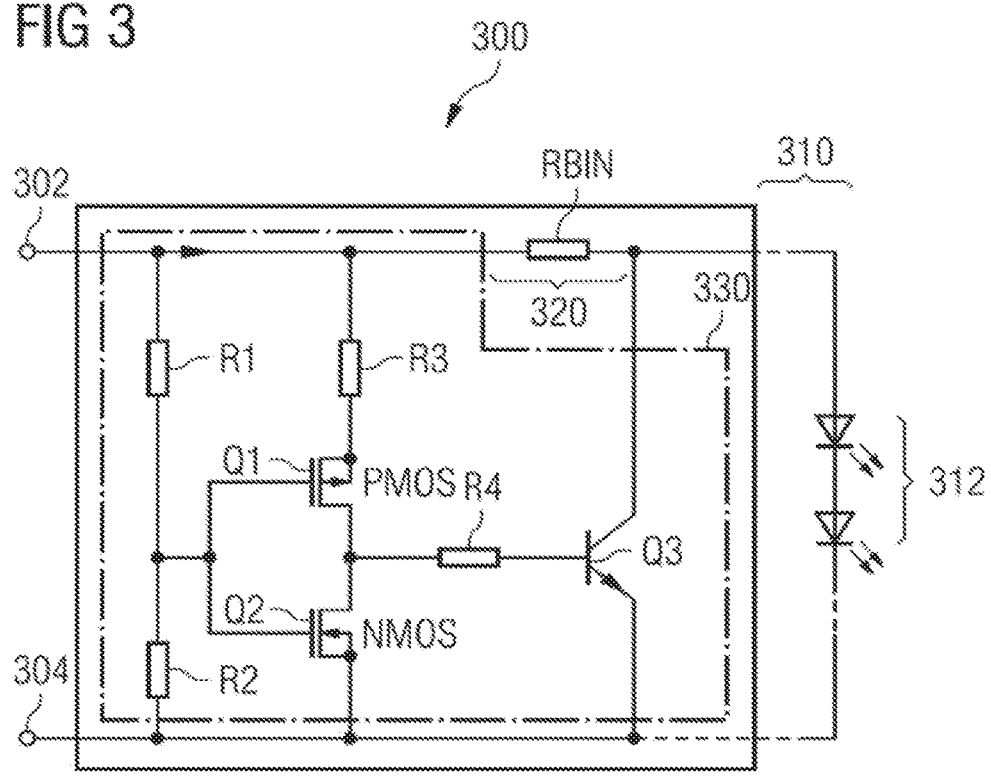
FIG. 3 shows an electronic circuit according to the invention in one preferred embodiment.

Unless otherwise specified, technical features described in detail for one given embodiment may be combined with the technical features described in the context of other embodiments described by way of nonlimiting example. Similar reference numbers will be used to reference similar concepts in various embodiments of the invention. For example, the references 100, 200 and 300 designate an electronic circuit according to the invention, in three described embodiments.

FIG. 1 gives an illustration of one preferred embodiment of the invention. An electronic circuit 100 comprises two connection terminals 102, 104, which are intended to connect the electronic circuit to electrical supply means 10. The circuit comprises at least one first branch containing light sources 112 that are mounted in series. By way of nonlimiting example, it may be a question of light-emitting diodes (LEDs).

In the context of an electronic circuit 100 for a luminous module of a motor vehicle, the electrical supply means 10 may comprise an electronic circuit or a microcontroller component implementing the function for controlling the supply of the LEDs. Such circuits and/or microcontroller components are known per se in the art and will not be described in detail in the context of the present invention.

The electronic circuit 100 comprises a second branch 120 comprising a resistive component, for example a resistor Rbin. The resistance of the resistor Rbin encodes or represents a property of the one or more light sources 112. It is for example a question of bin information identifying the LEDs. This information in particular allows the electrical supply means to be configured, since the magnitude of the forward current to be delivered to the LEDs is specified by the bin information. When a current of a preset magnitude is flowing through the resistor Rbin, the voltage drop across the terminals of the latter may be measured. From this measurement, the resistance of the resistor may be deduced and compared to a set of preset values. All the preset values are related to corresponding direct voltages and bin information. Measuring the voltage drop across the terminals of the resistor Rbin therefore allows the bin information and forward voltage associated therewith to be identified. Thus, read-out of the voltage drop across the terminals of Rbin gives access to the bin information and allows the electrical supply means to be correctly configured. The preset resistances of the resistor Rbin and the bin information and forward current values associated therewith are preferably pre-recorded by programming in the microcontroller component of the electrical supply means 10. Alternatively, these data are recorded in a memory component to which the electrical supply means have read access.

A switching unit 130 is intended to supply said second branch 120 comprising the resistor Rbin with electricity depending on the magnitude of the electric current delivered to the electric circuit by the electrical supply means.

The electronic circuit 100 allows the Rbin information to be obtained in the following way. In a first step, the electrical supply means 10 inject an electric current of a first preset magnitude, called the sampling current, into the electronic circuit. The first current magnitude is lower than a preset threshold value. It may for example be lower than 10, 5 or 1 mA. The first magnitude is clearly lower than the magnitude of the forward current of usual LEDs. The switching unit 130 is configured so that the second branch 120 of the electric circuit is supplied with electricity when a current having the first preset magnitude is injected into the electronic circuit 100. While the sampling current is passing through the resistor Rbin, the electrical supply means 10 measure the voltage drop across the terminals of this resistor. The voltage drop thus measured allows the bin value to be deduced using the pre-recorded parameters.

The bin value thus gathered allows the electrical supply means 10 to select a forward current magnitude to be delivered to the electronic circuit 100, in order to supply the light sources 112 of the first circuit branch. In a second step, the electrical supply means deliver a current having at least the magnitude of the forward current thus identified to the electronic circuit 100. As the magnitude of the electric current flowing through the electronic circuit 100 in this step is higher than the threshold value, the switching unit excludes the second circuit branch containing the resistor Rbin from the supplied circuit. As the magnitude of the electric current flowing through the electronic circuit 100 corresponds at least to the forward current of the light sources 112, the latter are adequately supplied.

The step of injecting the sampling current may preferably be of a duration shorter than 20, 10 or 5 ms, and it may preferably be repeated periodically, or each time the luminous function provided by the light sources 112 is turned on.

In the embodiment in FIG. 2, the electronic circuit 200 comprises two connection terminals 202, 204, which are intended to connect the electronic circuit to electrical supply means (not illustrated). The circuit comprises a first branch 210 containing light sources 212 that are mounted in series. A second circuit branch 220 comprises a resistor Rbin. The two branches 210, 220 are mounted in parallel and the resistance of the resistor Rbin encodes the bin information identifying the LEDs 212. The switching unit 230 is intended to supply said second branch 220 comprising the resistor Rbin with electricity depending on the magnitude of the electric current delivered to the electric circuit by the electrical supply means. The switching unit 230 consists of a CMOS inverter circuit that provides the NOT logic function, the output of which controls the state of a switching component that has been illustrated using a transistor Q3. When the sampling current is injected into the electronic circuit 200, the transistor Q1 closes, meaning that the transistor Q3 also closes and that the sampling current flows through the resistor Rbin. When, in a second phase, a current of greater magnitude is injected into the electronic circuit 200, this causes a higher voltage to appear across the terminals of the CMOS inverter. As a result, the transistor Q2 closes whereas the transistor Q1 opens. Therefore, the transistor Q3 also opens and the electric current does not flow through the resistor Rbin. When the electric current is higher than the forward current of the LEDs 212, only the latter are supplied and there is no loss of power in the resistor Rbin. Preferably, the resistances R1 and R2 are high, so as to minimize as much as possible their electrical current consumption.

FIG. 3 shows an alternative embodiment in which the electronic circuit 300 comprises two connection terminals 302, 304, which are intended to connect the electronic circuit to electrical supply means (not illustrated). The circuit comprises a first branch 310 containing light sources 312 that are mounted in series. A second circuit branch 320 comprises a resistor Rbin. In this embodiment, the two branches 310, 320 are mounted in parallel and the resistance of the resistor Rbin encodes the bin information identifying the LEDs 312. By way of example, the illustrated switching unit 330 also consists of a CMOS inverter.

It goes without saying that the specifications of the electrical components and the threshold value of the current depends on the target application. Those skilled in the art will be able, on the basis of the given description, to adapt the components described to adapt the electronic circuit according to the invention to the needs of specific applications. Such modifications nonetheless remain within the scope of the invention.

It will be understood that the principle of storing information relating to the components of the electronic circuit 100, 200, 300 in a resistor integrated into the electronic circuit may also be applied to components other than light sources, or to information other than bin information, while still respecting the principles of the invention as described above.

The invention claimed is:

1. Electronic circuit for a luminous module of a motor vehicle, the circuit comprising two terminals that are intended for the supply of electric current to the circuit, the circuit comprising at least one semiconductor-component light source forming part of a first circuit branch, and a component Rbin, forming part of a second circuit branch, and comprising a resistor, the resistance of which is representative of a property of at least one light source, wherein the electric circuit comprises a switching unit that is intended to supply said second branch with electricity depending on the magnitude of the electric current delivered to the electric circuit.

2. Electronic circuit according to claim 1, wherein the switching unit is configured so that the second branch is supplied exclusively when an electric current of a magnitude lower than a first preset threshold value is passing through the circuit.

3. Electronic circuit according to claim 1, wherein the first threshold value is lower than 10 mA, and preferably lower than 5 mA.

4. Electronic circuit according to claim 1, wherein the first circuit branch is mounted in parallel with the second circuit branch.

5. Electronic circuit according to claim 1, wherein the first circuit branch is mounted in series with the second circuit branch.

6. Electronic circuit according to claim 1, wherein the switching unit comprises a circuit providing a NOT logic function the output of which controls a switching component (Q3), the supply of the second circuit branch depending on the state of said switching component (Q3).

7. Electronic circuit according to claim 6, wherein the circuit providing the NOT logic function comprises a complementary metal-oxide semiconductor (CMOS) inverter.

8. Electronic circuit according to claim 6, wherein the switching component (Q3) comprises a transistor.

9. Electronic circuit according to claim 1, wherein the light source comprises a light-emitting diode (LED), an organic light-emitting diode (OLED), or a laser diode.

10. Electronic circuit according to claim 1, wherein the resistance of the resistor Rbin is representative of a bin value of the light sources of the circuit.

11. Luminous module for a motor vehicle, comprising means for controlling the electrical supply of at least one semiconductor-component light source, wherein the module comprises an electronic circuit according to claim 1 containing said light source.

12. Method for controlling the electrical supply in a luminous module according to claim 11, wherein the method comprises the following steps:
 a) supplying the electronic circuit using an electric current of a first magnitude lower than a preset threshold value;
 b) measuring the voltage drop in step;
 c) then, supplying the electronic circuit using an electric current of a second magnitude, the second magnitude being dependent on the voltage drop measured in step (b).

13. Method for controlling the electrical supply in a luminous module according to claim 12, wherein the first step has a duration shorter than 20 ms.

14. Method for controlling the electrical supply in a luminous module according to claim 13, wherein the first step has a duration shorter than 10 ms.

15. Electronic circuit according to claim 2, wherein the first threshold value is lower than 10 mA, and preferably lower than 5 mA.

16. Electronic circuit according to claim 3, wherein the first circuit branch is mounted in parallel with the second circuit branch.

17. Electronic circuit according to claim 3, wherein the first circuit branch is mounted in series with the second circuit branch.

18. Electronic circuit according to claim 5, wherein the switching unit comprises a circuit providing a NOT logic function the output of which controls a switching component (Q3), the supply of the second circuit branch depending on the state of said switching component (Q3).

19. Electronic circuit according to claim 7, wherein the switching component (Q3) comprises a transistor.

20. Electronic circuit according to claim 8, wherein the light source comprises a light-emitting diode (LED), an organic light-emitting diode (OLED), or a laser diode.

\* \* \* \* \*